United States Patent
Singhal et al.

(10) Patent No.: US 9,131,441 B2
(45) Date of Patent: Sep. 8, 2015

(54) APPARATUS AND METHOD FOR PERFORMING BETTER PLMN SEARCH DURING CONNECTED MODE DRX

(71) Applicant: QUALCOMM Incorporated, San Diego, CA (US)

(72) Inventors: Vaibhav Singhal, San Diego, CA (US); Praveen N. Kona, San Diego, CA (US); Srinivasan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 13/796,961

(22) Filed: Mar. 12, 2013

(65) Prior Publication Data

US 2014/0274038 A1    Sep. 18, 2014

(51) Int. Cl.
| | |
|---|---|
| H04W 4/00 | (2009.01) |
| H04W 52/02 | (2009.01) |
| H04W 48/16 | (2009.01) |
| H04W 76/04 | (2009.01) |
| H04W 68/00 | (2009.01) |
| G08C 17/00 | (2006.01) |
| H04J 1/16 | (2006.01) |

(52) U.S. Cl.
CPC .......... *H04W 52/0209* (2013.01); *H04W 48/16* (2013.01); *H04W 76/048* (2013.01)

(58) Field of Classification Search
CPC ............ H04W 48/16; H04W 52/0209; H04W 76/048
USPC ......................................................... 455/434
See application file for complete search history.

(56) References Cited

U.S. PATENT DOCUMENTS

| | | | |
|---|---|---|---|
| 8,200,253 B2 | 6/2012 | Du | |
| 8,260,291 B2 | 9/2012 | Wu | |
| 8,310,946 B2 | 11/2012 | Somasundaram et al. | |
| 2008/0108346 A1* | 5/2008 | Umatt et al. ............... | 455/432.1 |
| 2009/0185524 A1 | 7/2009 | Sammour et al. | |
| 2011/0003555 A1* | 1/2011 | Guo .......................... | 455/67.11 |
| 2012/0069800 A1 | 3/2012 | Soliman et al. | |
| 2012/0190361 A1 | 7/2012 | Shaikh et al. | |
| 2013/0044660 A1* | 2/2013 | Edara et al. ................... | 370/311 |
| 2013/0196659 A1* | 8/2013 | Damji et al. .................. | 455/434 |

(Continued)

OTHER PUBLICATIONS

3GPP TS 36.304 V8.10.0, "3rd Generation Partnership Project; Technical Specification Group Radio Access Network; Evolved Universal Terrestrial Radio Access (E-UTRA); User Equipment (UE) procedures in idle mode (Realease 8)", Jun. 2011, pp. 4, Section 4.3.

(Continued)

*Primary Examiner* — Timothy Pham
(74) *Attorney, Agent, or Firm* — Arent Fox LLP (57) ABSTRACT

Disclosed are methods and apparatus for performing a better PLMN (BPLMN) search during connected mode DRX. In one aspect, a user equipment (UE) detects a trigger to begin a BPLMN search while in connected mode discontinuous reception (CDRX); determines whether it is configured for a manual BPLMN search; determine whether the CDRX duration is greater than or equal to the minimum amount of time required to perform the manual BPLMN search; and when determined that the CDRX duration is greater than or equal to the minimum amount of time required for the BPLMN search, performs the manual BPLMN search while in the CDRX.

16 Claims, 7 Drawing Sheets

(56) References Cited

U.S. PATENT DOCUMENTS

2013/0210428 A1* 8/2013 Manna et al. ............... 455/434
2013/0343252 A1* 12/2013 Chakraborty et al. ....... 370/311
2014/0155061 A1* 6/2014 Kherani et al. ............. 455/434
2014/0235237 A1* 8/2014 Shin et al. .................. 455/434

OTHER PUBLICATIONS

International Search Report and Written Opinion dated Oct. 9, 2014 issued in International Patent Application No. PCT/US2014/023418. (12 total pages).

* cited by examiner

APPARATUS AND METHOD FOR PERFORMING BETTER PLMN SEARCH DURING CONNECTED MODE DRX

BACKGROUND

1. Field

Aspects of the present disclosure relate generally to wireless communication systems, and more particularly, to an apparatus and method for performing a better PLMN search during connected mode discontinuous reception (CDRX).

2. Background

A Public Land Mobile Network (PLMN) is a radio access network (RAN) that provides mobile telecommunications services. The PLMN is typically a multiple-access system capable of supporting communication with multiple users by sharing the available system resources (e.g., bandwidth and transmit power). Multiple PLMNs may be operated by different operators in the same geographic area. These PLMNs may use different radio access technologies (RATs) and communication standards, such as code division multiple access (CDMA), time division multiple access (TDMA), frequency division multiple access (FDMA), 3GPP Long Term Evolution (LTE), Global System for Mobile Communications (GSM), Universal Terrestrial Radio Access (UTRA), etc.

Due to the large variety of PLMNs with often overlapping coverage areas, popularity of multimode user equipment (UE) capable of supporting multiple RATs has grown significantly. These multimode UEs may have one or more radios for communication with multiple RATs. During operation, a multimode UE typically searches for available PLMNs and registers with one of them. The UE may then periodically search for a better PLMN (BPLMN), which may use the same or different RAT as the serving PLMN. If a better PLMN is found the UE may handover to the new PLMN. However, due to network differences, performing BPLMS search and inter-technology handovers are resource intensive processes. Accordingly, there is a need to improve a better PLMN search and inter-technology handover processes.

SUMMARY

The following presents a simplified summary of one or more aspects of methods, apparatuses and computer program products for performing a BPLMN search during connected mode DRX in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, an example method for performing a BPLMN search by user equipment (UE) during connected mode discontinuous reception (CDRX) comprises detecting by the UE a trigger to begin a BPLMN search while in CDRX. The method further comprises determining whether the UE is configured for a manual BPLMN search. The method further comprises determining whether the CDRX duration is greater than or equal to the minimum amount of time required to perform the manual BPLMN search. The method further comprises, when determined that the CDRX duration is greater than or equal to the minimum amount of time required for the BPLMN search, performing the manual BPLMN search while in the CDRX.

In another aspect, an apparatus for performing a BPLMN search by the UE during connected mode discontinuous reception (CDRX), comprises a BPLMN search trigger detector configured to detect a trigger to begin a BPLMN search by the UE while in CDRX. The apparatus further comprises a search mode determiner configured to determine whether the UE is configured for a manual BPLMN search. The apparatus further comprises a CDRX mode duration and search duration comparator configured to determine whether the CDRX duration is greater than or equal to the minimum amount of time required to perform the manual BPLMN search. The apparatus further comprises a BPLMN searcher configured to, when determined that the CDRX duration is greater than or equal to the minimum amount of time required for the BPLMN search, perform by the UE the manual BPLMN search while in the CDRX.

In another aspect, an apparatus for performing a BPLMN search during connected mode discontinuous reception (CDRX) comprises means for detecting a trigger to begin a BPLMN search by the UE while in CDRX. The apparatus further comprises means for determining whether the UE is configured for a manual BPLMN search. The apparatus further comprises means for determining whether the CDRX duration is greater than or equal to the minimum amount of time required to perform the manual BPLMN search. The apparatus further comprises means for, when determined that the CDRX duration is greater than or equal to the minimum amount of time required for the BPLMN search, performing the manual BPLMN search during CDRX.

In another aspect, a computer program product for performing a BPLMN search by UE during connected mode discontinuous reception (CDRX) comprises computer-readable medium, comprising code for causing at least one computer to: detect a trigger to begin a BPLMN search by the UE while in CDRX. The product further comprises code for causing at least one computer to determine whether the UE is configured for a manual BPLMN search. The product further comprises code for causing at least one computer to determine whether the CDRX duration is greater than or equal to the minimum amount of time required to perform the manual BPLMN search. The product further comprises code for causing at least one computer to, when determined that the CDRX duration is greater than or equal to the minimum amount of time required for the BPLMN search, perform the manual BPLMN search while in the CDRX.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
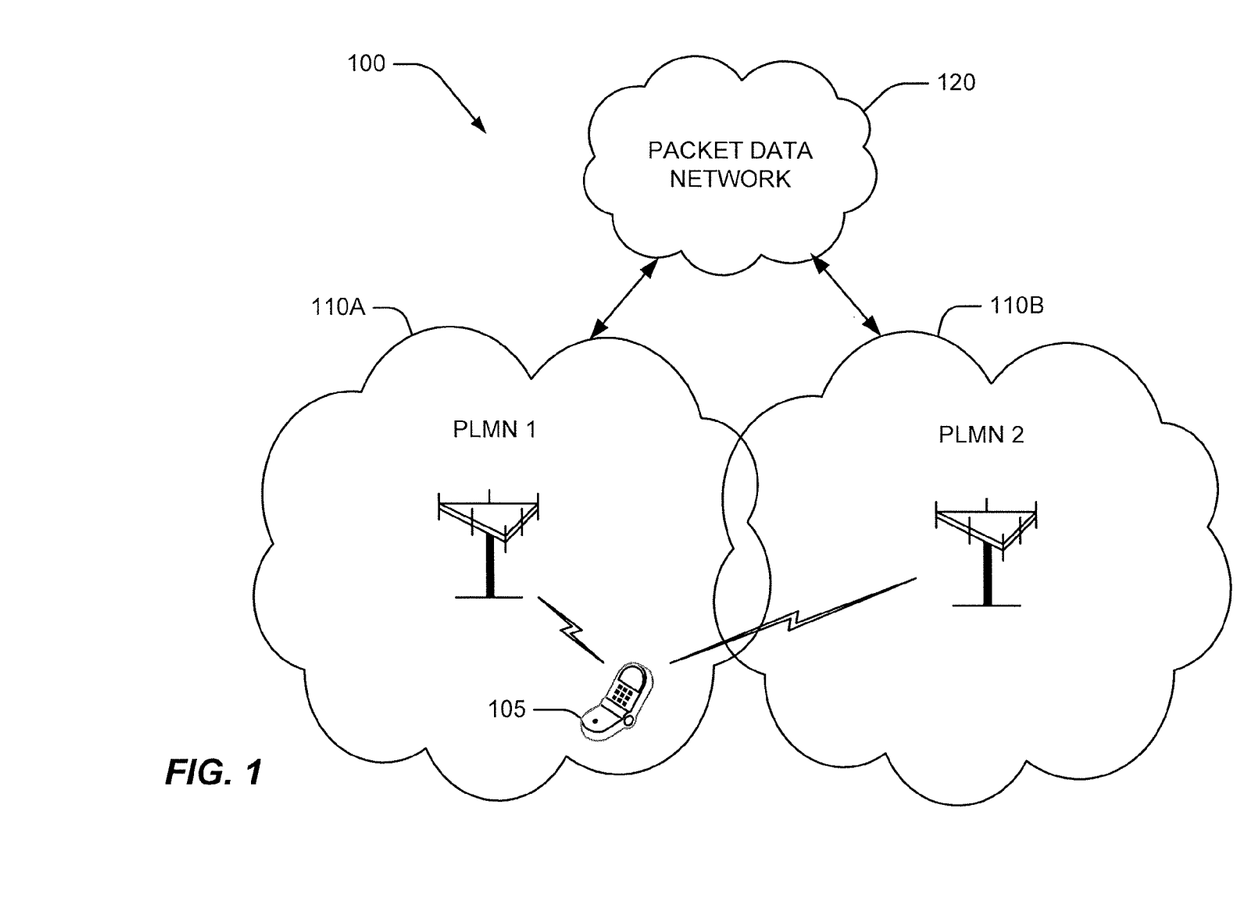
FIG. 1 is a block diagram of an example wireless communication system that can be employed in conjunction with the various systems and methods described herein.

FIG. 1 illustrates one aspect of a wireless communication system 100 that includes a plurality of different Public Land Mobile Networks (PLMNs), such as PLMNs 110A and 100B, which provide to one or more UEs 105 voice, data and other telecommunication services, as well as access to the core packet data network 120, such as the Internet, or a core circuit-switched network, such as public switched telephone network (not shown). UE 105 may include, but not limited to, a cellular telephone, a cordless telephone, a session initiation protocol (SIP) phone, a personal digital assistant (PDA), a handheld device having wireless connection capability, a laptop computer, or other portable processing device having a cellular or wireless modem. UE 105 may also be referred to as a subscriber unit, subscriber station, mobile station, mobile, remote station, remote terminal, access terminal, user terminal, terminal, wireless communication device, user agent, user device, mobile device or the like.

In one aspect, PLMNs 110A and 110B may use the same or different RATs, which may include but are not limited to, CDMA, TDMA, FDMA, OFDMA, SC-FDMA and other known or future technologies. For example, CDMA technology is implemented in Universal Terrestrial Radio Access (UTRA), CDMA2000 and other networks. UTRA includes Wideband-CDMA (W-CDMA) and other variants of CDMA. CDMA2000 includes 1 xRTT, high rate packet data (HRPD), and evolved HRPD (eHRPD) technologies. TDMA technology is implemented in Global System for Mobile Communications (GSM). OFDMA technology is implemented in Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, radio access networks may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Generally, while being within the coverage area of PLMN 110A, the mobile UE 105 may register with and receive telecommunication services from PLMN 110A. However, as UE 105 moves out of the coverage area of the serving PLMN 110A and into the coverage area of PLMN 110B, the UE 105 may handover to the PLMN 110B. To that end, while being connected to the PLMN 110A, the UE 105 may periodically search for a better PLMN by, for example, tuning to monitor pilot channels (PCH) of other PLMNs (e.g., PLMN 110B) and comparing power levels of the received pilot signals with the signal strength of the serving PLMN 110A on which UE 105 is currently registered. Generally, if the pilot signal strength of PLMN 110B begins to exceed the signal strength of serving PLMN 110A, the UE 105 may handover to PLMN 110B. Generally, UE 105 may search for a better PLMN of the same or different RAT.

Different RATs provide different mechanisms for better PLMN searches. For example, 3GPP LTE systems provide two modes for better PLMN selection: (i) In automatic mode, the UE utilizes a prioritized list of PLMNs to choose the highest priority PLMN for handover. Automatic BPLMN search may be typically performed when UE in limited service or on a roaming PLMN. (ii) In manual mode, UE indicates to the user which PLMNs are available and allows the user to make a manual selection of the better PLMN. Generally, the time allocated for BPLMN search (commonly referred as guard timer) is 150 seconds. LTE Radio Resource Control (RRC) protocol may be used to controls activation of BPLMN search. (See 3GPP TS 23.122 V8.2.0).

Many types of PLMNs, including 3GPP LTE systems, support Discontinuous Reception (DRX) mode of operation on the downlink (DL) channel. The UEs operating in the DRX mode are configured to listen for transmissions from the base stations (e.g., NodeB) on a Physical Downlink Control Channel (PDCCH) during predefined time duration, commonly referred as connected mode (or ON state), and turn off their receivers to save UE's battery power during a predefined periods of inactivity, commonly referred as idle mode (or OFF state), in which no downlink transmissions on PDCCH channel are scheduled. The UE can transition between the two DRX modes either implicitly, based on the expiration of preconfigured timers, or explicitly, based on, e.g., the reception of a RRC protocol DRX command from the serving PLMN.

Generally, better PLMN searches by UEs are executed in such a way that UE does not miss any transmissions from the serving PLMN. Therefore, the timing of the BPLMN searches is inherently linked to the DRX mode and may be directly controlled by the RRC DRX protocol command (trigger). For example, UEs generally initiate BPLMN search only when RRC has moved in the idle mode DRX. A manual PLMN search would be typically suspended as soon as RRC is moved to the connected mode DRX, and resumed once RRC has returned to the idle mode DRX and if guard timer has not expired. However, a UE may often have at least one application running in the background, such as an email client, which will keep the UE in the connected mode DRX and which makes completion of the manual BPLMN search difficult.

In one aspect, to overcome this problem, the UE 105 may be configured to perform/complete a manual PLMN search while in the connected mode DRX (CDRX). For example, the UE 105 may detect a RRC trigger to begin a BPLMN search. The UE 105 may then determine whether it is operating in the DRX connected or idle mode. If the UE 105 is in idle mode, the UE 105 may perform manual BPLMN search. If the UE 105 is in CDRX, rather than suspending all BPLMN searches, as in the typical manner, the UE 105 may then determine whether a long CDRX duration time is greater than or equal to the minimum amount of time required for performing a BPLMN search (e.g., 640 ms). Upon determining that the CDRX duration time is greater than or equal to the minimum amount of time required for performing the BPLMN search, the UE 105 may perform a manual BPLMN search during in the connected mode DRX. As a result of these optimizations, UE's non-scheduled time is utilized more effectively to meet user request, and UE 105 can search for better PLMNs (e.g., PLMN 110B) even if some background application is keeping UE 105 in the connected mode DRX.

Figure 2:
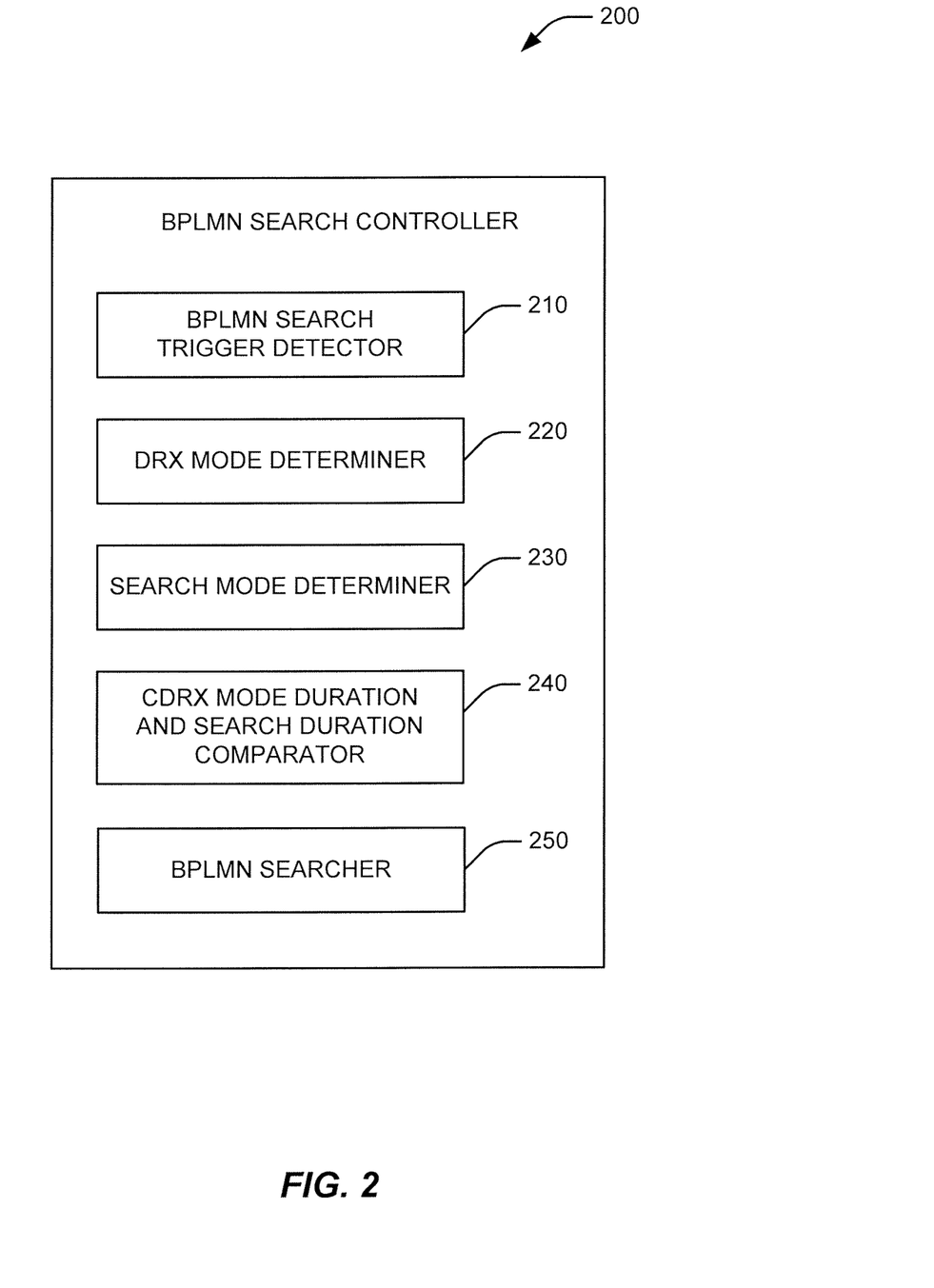
FIG. 2 is a block diagram of an example aspect of a BPLMN search controller.

FIG. 2 illustrates one example aspect of a BPLMN search controller, which can be implemented in the UE 105 of FIG. 1, for performing a BPLMN searches according to aspects disclosed herein. As shown, the BPLMN search controller 200 includes a BPLMN search trigger detector 210, DRX mode determiner 220, search mode determiner 230, CDRX mode duration and search duration comparator 240, and BPLMN searcher 250. In one aspect, the BPLMN search trigger detector 210 is configured to detect a trigger for performing a BPLMN search. Example BPLMN search triggers include, but not limited to, UE 105 performing initial PLMN selection upon power up, UE 105 moving into a new PLMN having different RAT then serving PLMN, UE 105 loosing connection with the serving PLMN, UE 105 receiving RRC request from the serving PLMN to perform BPLMN search, etc. The DRX mode determiner 220 is configured to determine whether UE 105 is operating in the DRX connected or idle mode. For example, DRX mode determiner 220 may check LTE RRC state parameters to determine current DRX mode of the UE 105 and duration of this mode. The search mode determiner 230 is configured to determine whether to perform a manual or automatic BPLMN search. For example, search mode determiner 230 may check LTE RRC state parameters to determine the specified BPLMN search mode and search duration of the UE 105. If the UE 105 is in idle mode DRX, the search mode determiner 230 may select to perform a manual BPLMN search. However, if the UE 105 is determined to be in the connected mode DRX, the search mode determiner 230 will check whether UE 105 is configured to perform manual or automatic BPLMN search. If the UE 105 is configured to perform automatic BPLMN search, the search mode determiner 230 may suspend BMPLN search in the CDRX mode and resume it once the UE 105 returns to the idle mode in the next DRX cycle. If the search mode determiner 230 identifies that the UE 105 is configured to perform manual BPLMN search, the CDRX mode duration and search duration comparator 240 will be activated to determine whether a long CDRX duration time is greater than or equal to the minimum amount of time required for performing a BPLMN search (e.g., 640 ms or greater). If the CDRX duration time is less than the minimum amount of time required for performing a PLMN search, the BMPLN search may be suspended for the remainder of CDRX and be resumed once the UE 105 returns to the idle mode in the next DRX cycle. However, if the CDRX duration time is greater than or equal to the minimum amount of time required for performing a PLMN search, the BPLMN searcher 250 of the BPLMN search controller 200 will be activated to perform a manual BPLMN search during CDRX. When the BPLMN search is complete and a better PLMN is identified, the UE 105 may reselect or handover to that better PLMN (e.g., PLNM 105B). If no better PLMN is identified, the UE 105 may remain connected to the serving PLMN.

Figure 3:
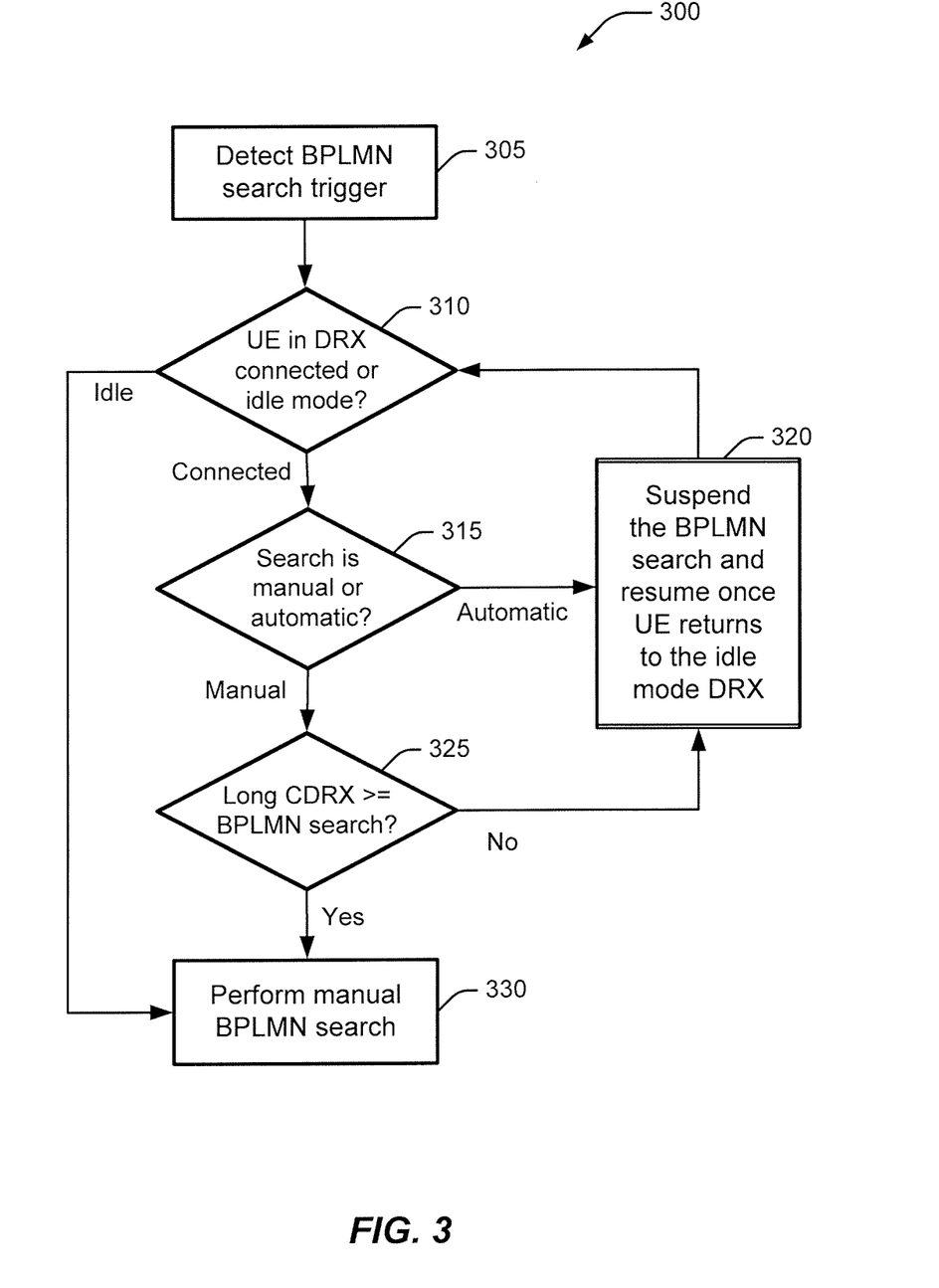
FIG. 3 is a flow chart of an example method for performing a BPLMN search.

FIG. 3 illustrates one example methodology for performing a BPLMN search by a UE, such as UE 105 of FIG. 1 that implements a BPLMN search controller 200 of FIG. 2. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In FIG. 3, at step 305, method 300 includes detecting, by the UE, a trigger for performing a BPLMN search. For example, in an aspect, the UE 105 may include a BPLMN search controller 200 having a BPLMN search trigger detector 210 configured to detect a trigger for performing a BPLMN search. At step 310, method 300 includes determining whether UE 105 is operating in the connected or idle mode DRX. For example, in an aspect, the UE 105 may include a DRX mode determiner 220 configured to determine whether UE 105 is operating in the connected or idle mode DRX. If the UE is in idle mode DRX, the method 300 proceeds to step 330 which includes performing a manual BPLMN search. For example, in one aspect, the UE 105 may include a BPLMN searcher 250 that can perform a BPLMN search. If the UE is in the CDRX, the method 300 proceeds to step 315 which includes determining whether to perform a manual or automatic BPLMN search. For example, in an aspect, the UE 105 includes a search mode determiner 230 configured to determine whether to perform a manual or automatic BPLMN search in the CDRX. If, at step 315, the method 300 determines that the UE is configured to perform automatic BPLMN search, the method 300 continues at step 320 which includes suspending BMPLN search during the CDRX and resuming it once the UE returns to the idle mode in the next DRX cycle at step 310. For example, in an aspect, the UE 105 includes a search mode determiner 230 to perform this function. If, at step 315, the method 300 determines that the UE is configured to perform manual BPLMN search, the method continues at step 325 which includes comparing the long CDRX duration time and the minimum amount of time required for performing a BPLMN search and determining whether the long CDRX is greater or equal to the BPLMN search duration. For example, in an aspect, the UE 105 includes a CDRX mode duration and search duration comparator 240 to perform this comparison. If, at step 325, the method 300 determines that the CDRX duration time is less than the minimum amount of time required for performing a PLMN search, the method 300 continues at step 320 that includes suspending the BMPLN search for the remainder of CDRX and be resumed once the UE 105 returns to the idle mode in the next DRX cycle. However, if the CDRX duration time is greater than or equal to the minimum amount of time required for performing a PLMN search, the BPLMN searcher 250 will be activated to perform a manual BPLMN search during CDRX.

Figure 4:
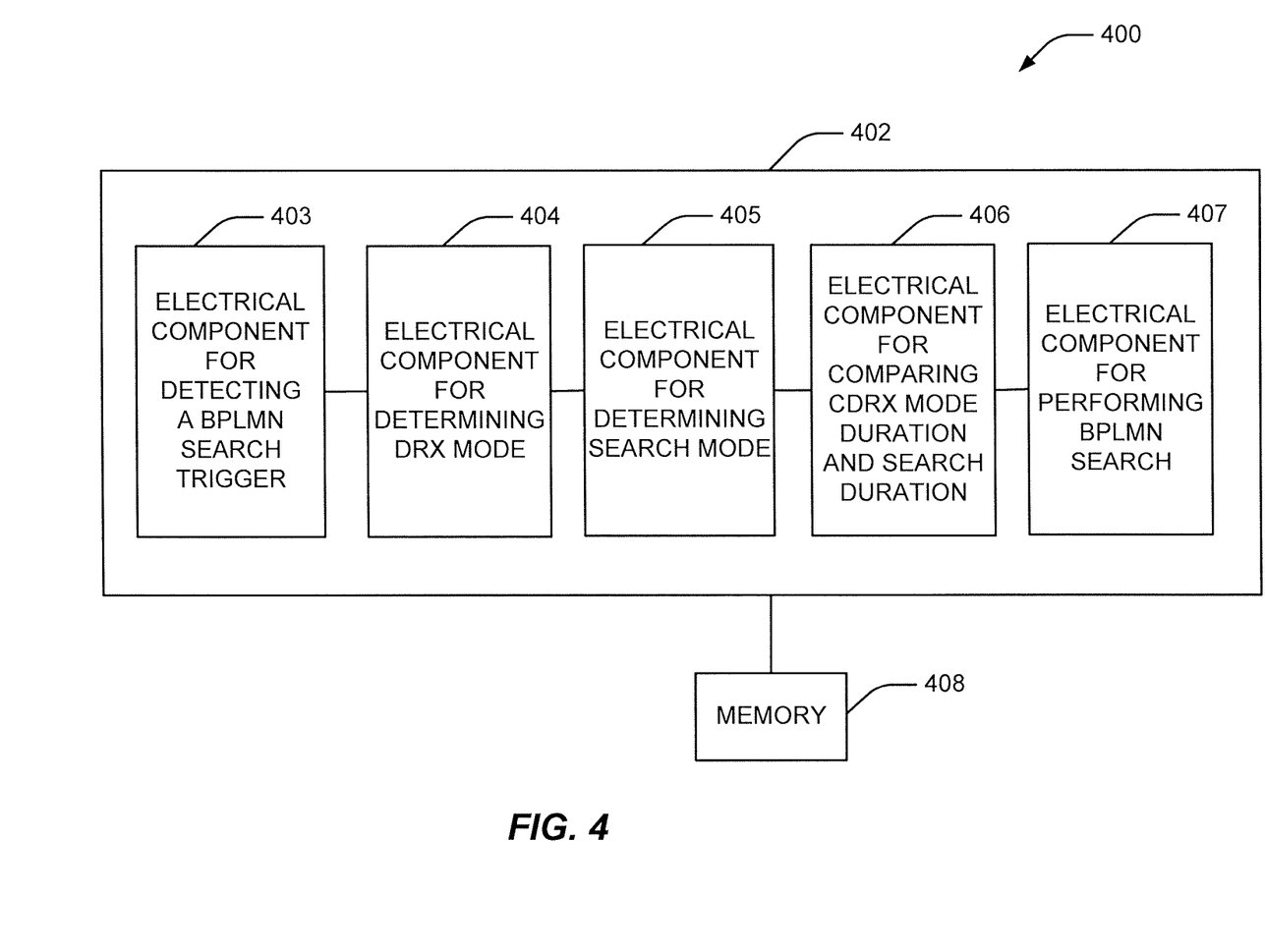
FIG. 4 is a block diagram of an example electrical system for performing a BPLMN search.

FIG. 4 illustrates an example system 400 for performing a BPLMN search. For example, system 400 can reside at least partially within a UE, such as UE 105 of FIG. 1. It is to be appreciated that system 400 is represented as including functional blocks, which can be functional blocks that represent functions of the BPLMN search controller 200 of FIG. 2 implemented by a processor, software, or combination thereof (e.g., firmware). System 400 includes a logical grouping 402 of electrical components that can act in conjunction. For instance, logical grouping 402 can include an electrical component 403 for detecting a BPLMN search trigger. Moreover, logical grouping 402 can include an electrical component 404 for determining the DRX mode of the UE. Moreover, logical grouping 402 can include an electrical component 405 for determining the BPLMN search mode. Moreover, logical grouping 402 can include an electrical component 406 for comparing the CDRX mode duration and the BMPLMN search duration. Moreover, logical grouping 402 can include an electrical component 407 for performing a manual BPLMN search. Additionally, system 400 can include a memory 408 that retains instructions for executing functions associated with the electrical components 403-407, stores data used or obtained by the electrical components 403-407, etc. While shown as being external to memory 408, it is to be understood that one or more of the electrical components 403-407 can exist within memory 408. In one example, electrical components 403-407 can comprise at least one processor, or each electrical component 403-407 can be a corresponding module of at least one processor. Moreover, in an additional or alternative example, electrical components 403-407 can be a computer program product including a computer readable medium, where each of the electrical components 403-407 can be corresponding code.

Figure 5:
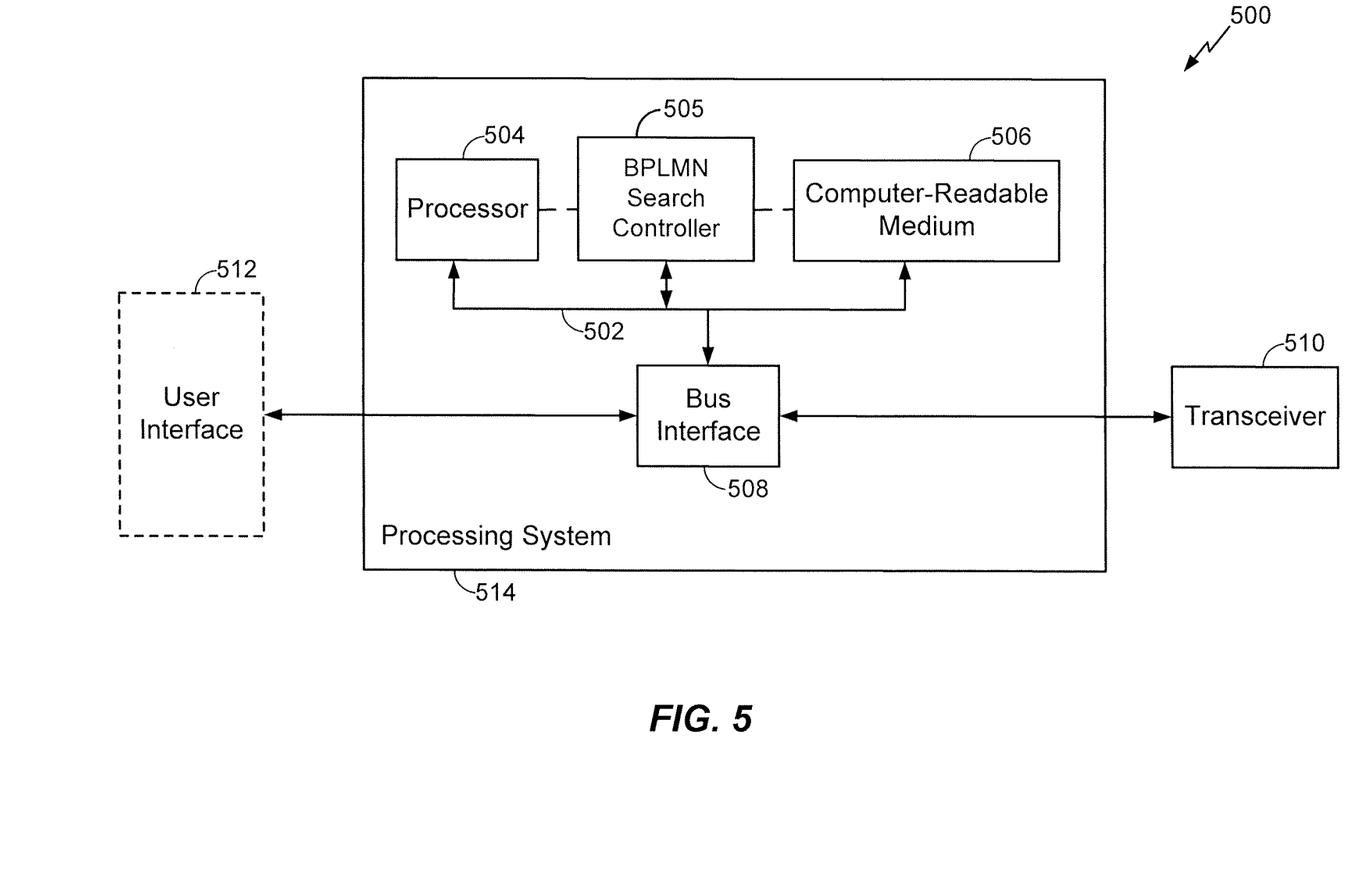
FIG. 5 is a block diagram of an example of a hardware implementation for an apparatus employing a processing system for performing a BPLMN search.

FIG. 5 is a block diagram illustrating an example of a hardware implementation for an apparatus 500, which may be UE 105 of FIG. 1, employing a processing system 514 that may be configured to execute the apparatus and methods for performing a BPLMN search as described herein with reference to FIGS. 2 and 3. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, computer-readable media, represented generally by the computer-readable medium 506, and a BPLMN search controller 505, such as a BPLMN search controller 200 of FIG. 2 or system 400 of FIG. 4. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided. The processor 504 is responsible for managing the bus 502 and general processing, including the execution of software stored on the computer-readable medium 506, including for example instructions for performing a method 300 of FIG. 3. The software, when executed by the processor 504, causes the processing system 514 to perform the various functions described infra for any particular apparatus. The computer-readable medium 506 may also be used for storing data that is manipulated by the processor 504 when executing software.

Figure 6:
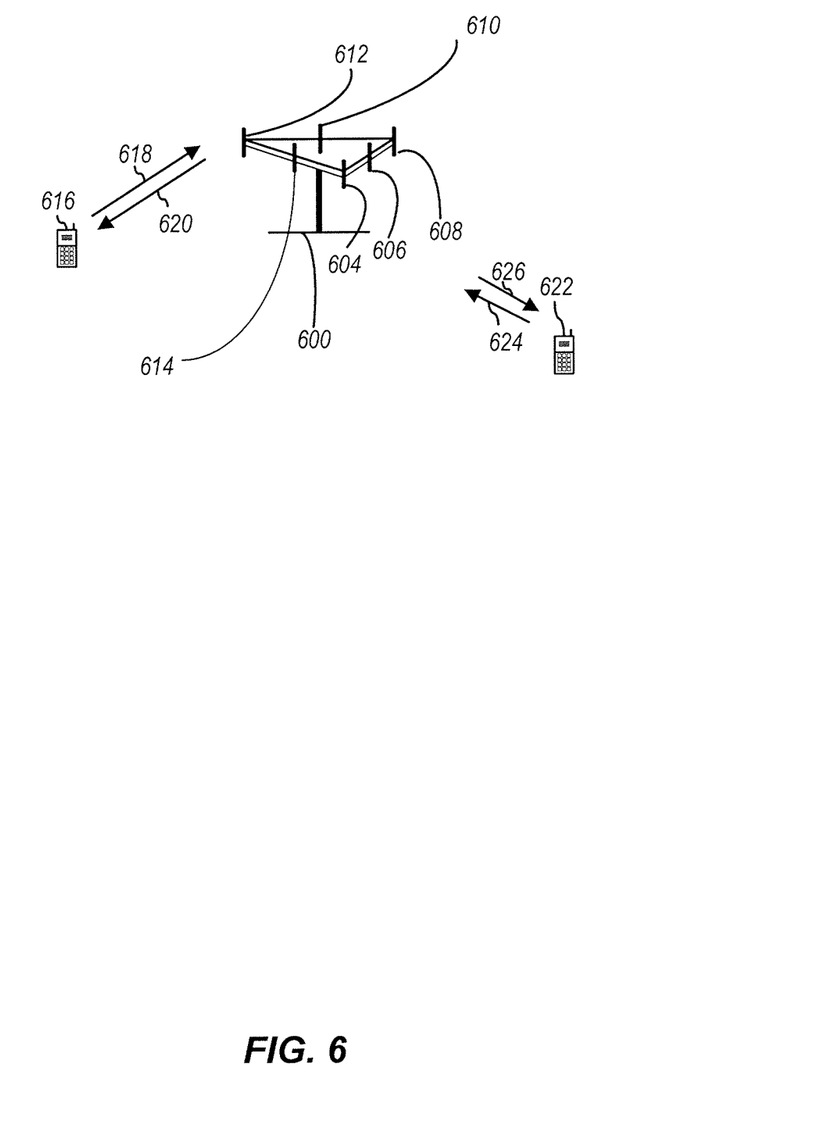
FIG. 6 is a block diagram of a multiple access wireless communication system that can be employed in conjunction with the various systems and methods described herein.

FIG. 6 is a block diagram of an example a multiple access wireless communication system. In one aspect, components of the wireless communication system correspond to the components of system in FIG. 1. An access point 600 (AP) includes multiple antenna groups, one including 604 and 606, another including 608 and 610, and an additional including 612 and 614. In one aspect, AP 600 may be associated with a PLMN, such as PLMN 110A in FIG. 1. In FIG. 6, only two antennas are shown for each antenna group, however, more or fewer antennas can be utilized for each antenna group. Access terminal 616 (AT) is in communication with antennas 612 and 614, where antennas 612 and 614 transmit information to access terminal 616 over forward link 620 and receive information from access terminal 616 over reverse link 618. In one aspect, AT 616 may be the UE 105 of FIG. 1. Access terminal 622 is in communication with antennas 604 and 606, where antennas 604 and 606 transmit information to access terminal 622 over forward link 626 and receive information from access terminal 622 over reverse link 624. In a FDD system, communication links 618, 620, 624 and 626 can use different frequency for communication. For example, forward link 620 can use a different frequency then that used by reverse link 618.

Each group of antennas and/or the area in which they are designed to communicate is often referred to as a sector of the access point. In the embodiment, antenna groups each are designed to communicate to access terminals in a sector of the areas covered by AP 600. In communication over forward links 620 and 626, the transmitting antennas of AP 600 utilize beamforming in order to improve the signal-to-noise ratio of forward links for the different ATs 616 and 622. Also, an access point using beamforming to transmit to access terminals scattered randomly through its coverage causes less interference to access terminals in neighboring cells than an access point transmitting through a single antenna to all its access terminals. Moreover, AP 600 can serve ATs 616 and 622 in a data call (e.g., VoIP, VoLTE, or any other delay sensitive application) and can provide functionality to modify communication parameters during handover to another access point, as described.

Figure 7:
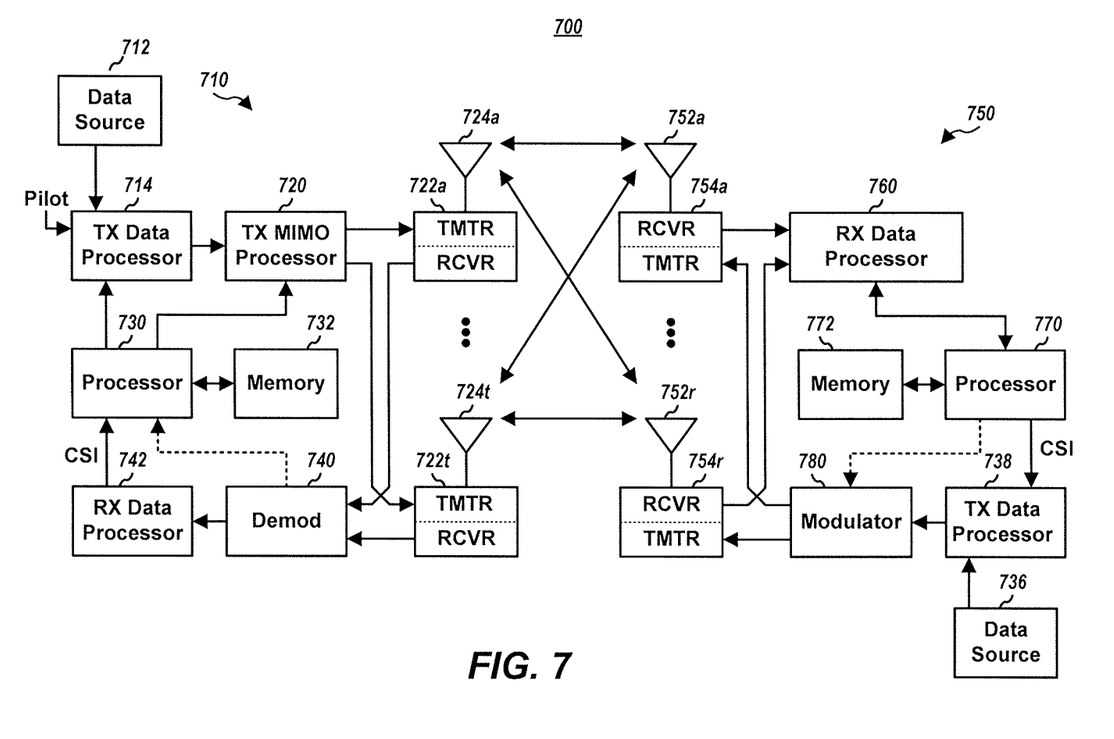
FIG. 7 is a block diagram of a communication system that can be employed in conjunction with the various systems and methods described herein.

FIG. 7 is a block diagram of an example transmitter system 710 (also known as the access point, which may correspond to the AP 600 in FIG. 6) and a receiver system 750 (also known as access terminal, which may corresponds to UE 105 in FIG. 1 or AT 616 of FIG. 6) in a MIMO system 700. At the transmitter system 710, traffic data for a number of data streams is provided from a data source 712 to a transmit (TX) data processor 714. In addition, it is to be appreciated that transmitter system 710 and/or receiver system 750 can employ the systems of FIGS. 1-2 and 4-6 and/or method of FIG. 3 described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions.

In an embodiment, each data stream is transmitted over a respective transmit antenna. TX data processor 714 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 730.

The modulation symbols for all data streams are then provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In certain embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use. Processor 770 formulates a reverse link message comprising a matrix index portion and a rank value portion.

The reverse link message can comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

Processors 730 and 770 can direct (e.g., control, coordinate, manage, etc.) operation at transmitter system 710 and receiver system 750, respectively. Respective processors 730 and 770 can be associated with memory 732 and 772 that store program codes and data. For example, processors 730 and 770 can perform functions described herein with respect to modifying parameters of a UE in a data call based on a handover of the UE to a target base station. Similarly, memory 732 and 772 can store instructions related to such, as described.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for performing a better public land mobile network (BPLMN) search by user equipment (UE), comprising:
   detecting a trigger to begin a BPLMN search by the UE;
   determining whether the UE is in connected mode discontinuous reception (CDRX) or idle mode discontinuous reception (DRX) with a third generation partnership project (3GPP) long term evolution (LTE) PLMN, wherein the CDRX corresponds to a connected mode during which the UE is configured to listen for transmissions from a base station over a physical downlink control channel (PDCCH);
   determining that the UE is configured for a manual BPLMN search;
   when determining that the UE is in the idle mode DRX with the 3GPP LTE PLMN, performing, by the UE, the manual BPLMN search;
   when determining that the UE is in the CDRX with the 3GPP LTE PLMN:
      determining whether a CDRX duration is greater than or equal to a minimum amount of time required to perform the manual BPLMN search;
      when determining that the CDRX duration is greater than or equal to a minimum amount of time required for the BPLMN search, performing, by the UE, the manual BPLMN search while in the CDRX with the 3GPP LTE PLMN; and
      when determining that the CDRX duration is less than the minimum amount of time required for the BPLMN search, suspending the BPLMN search until a next idle mode DRX cycle.

2. The method of claim 1, wherein, when determining that the UE is in the CDRX, determining whether the UE is configured for the manual BPLMN search or an automatic BPLMN search.

3. The method of claim 2, wherein, when determining that the UE is in the CDRX and configured for the automatic BPLMN search, suspending the BPLMN search until the next idle mode DRX cycle.

4. The method of claim 1, wherein determining whether the CDRX duration is greater than or equal to the minimum amount of time required for the BPLMN search comprises determining whether the CDRX duration is greater than or equal to 640 ms.

5. An apparatus for performing a better public land mobile network (BPLMN) search by user equipment (UE), comprising:
   a BPLMN search trigger detector configured to detect a trigger to begin a BPLMN search by the UE;
   a DRX mode determiner configured to determine whether the UE is in connected mode discontinuous reception (CDRX) or an idle mode discontinuous reception (DRX) with a third generation partnership project (3GPP) long term evolution (LTE) PLMN, wherein the CDRX corresponds to a connected mode during which the UE is configured to listen for transmissions from a base station over a physical downlink control channel (PDCCH);
   a search mode determiner configured to determine that the UE is configured for a manual BPLMN search;
   a BPLMN searcher configured to perform, by the UE, the manual BPLMN search when the DRX mode determiner determines that the UE is in the idle mode DRX with the 3GPP LTE PLMN;
   a CDRX mode duration and search duration comparator configured to determine whether a CDRX duration is greater than or equal to a minimum amount of time required to perform the manual BPLMN search when the DRX mode determiner determines that the UE is in the CDRX with the 3GPP LTE PLMN; and
   wherein the BPLMN searcher is further configured to:
      when the CDRX mode duration and search duration comparator determines that the CDRX duration is greater than or equal to the minimum amount of time required for the BPLMN search, perform, by the UE, the manual BPLMN search while in the CDRX with the 3GPP LTE PLMN; and
      when the CDRX mode duration and search duration comparator determines that the CDRX duration is less than the minimum amount of time required for the BPLMN search, suspend the BPLMN search until a next idle mode DRX cycle.

6. The apparatus of claim 5, wherein, when the DRX mode determiner determines that the UE is in the CDRX, the search mode determiner is further configured to determine whether the UE is configured for the manual BPLMN search or an automatic BPLMN search.

7. The apparatus of claim 6, wherein, when the DRX mode determiner determines that the UE is in the CDRX and the search mode determiner determines that the UE is configured for the automatic BPLMN search, the BPLMN searcher is configured to suspend the BPLMN search until the next idle mode DRX cycle.

8. The apparatus of claim 5, wherein the CDRX mode duration and search duration comparator determines that the CDRX duration is greater than or equal to the minimum amount of time required for the BPLMN search at least in part by determining whether the CDRX is greater than or equal to 640 ms.

9. An apparatus for performing a better public land mobile network (BPLMN) search by user equipment (UE), comprising:
   means for detecting a trigger to begin a BPLMN search by the UE;
   means for determining whether the UE is in connected mode discontinuous reception (CDRX) or idle mode discontinuous reception (DRX) with a third generation partnership project (3GPP) long term evolution (LTE)

PLMN, wherein the CDRX corresponds to a connected mode during which the UE is configured to listen for transmissions from a base station over a physical downlink control channel (PDCCH);

means for determining whether the UE is configured for a manual BPLMN search;

means for performing, by the UE, the manual BPLMN search when the means for determining whether the UE is in the CDRX or the idle mode DRX with the 3GPP LTE PLMN determines that the UE is in the idle mode DRX with the 3GPP LTE PLMN;

means for determining whether a CDRX duration is greater than or equal to a minimum amount of time required to perform the manual BPLMN search when the means for determining whether the UE is in the CDRX or the idle mode DRX with the 3GPP LTE PLMN determines that the UE is in the CDRX with the 3GPP LTE PLMN;

means for, when the means for determining whether the CDRX duration is greater than or equal to the minimum amount of time determines that the CDRX duration is greater than or equal to the minimum amount of time required for the BPLMN search, performing, by the UE, the manual BPLMN search while in the CDRX with the 3GPP LTE PLMN; and means for, when the means for determining whether the CDRX duration is greater than or equal to the minimum amount of time determines that the CDRX duration is less than the minimum amount of time required for the BPLMN search, suspending the BPLMN search until a next idle mode DRX cycle.

10. The apparatus of claim 9, further comprising means for determining whether the UE is configured for the manual BPLMN search or an automatic BPLMN search when the means for determining whether the UE is in the CDRX or the idle mode DRX with the 3GPP LTE PLMN determines that the UE is in the CDRX.

11. The apparatus of claim 10, further comprising means for suspending the BPLMN search until the next idle mode DRX cycle when the means for determining whether the UE is in the CDRX or the idle mode DRX with the 3GPP LTE PLMN determines that the UE is in the CDRX and the means for determining whether the UE is configured for the manual BPLMN search or the automatic BPLMN search determines that the UE is configured for the automatic BPLMN search.

12. The apparatus of claim 9, wherein the means for determining whether the CDRX duration is greater than or equal to the minimum amount of time determines whether the CDRX is greater than or equal to 640 ms.

13. A non-transitory computer-readable medium for performing a better public land mobile network (BPLMN) search by user equipment (UE), comprising:

code for detecting a trigger to begin a BPLMN search by the UE;

code for determining whether the UE is in connected mode discontinuous reception (CDRX) or idle mode discontinuous reception (DRX) with a third generation partnership project (3GPP) long term evolution (LTE) PLMN, wherein the CDRX corresponds to a connected mode during which the UE is configured to listen for transmissions from a base station over a physical downlink control channel (PDCCH);

code for determining whether a UE is configured for a manual BPLMN search;

code for performing, by the UE, the manual BPLMN search when the code for determining whether the UE is in the CDRX or the idle mode DRX with the 3GPP LTE PLMN determines that the UE is in the idle mode DRX with the 3GPP LTE PLMN;

code for determining whether a CDRX duration is greater than or equal to a minimum amount of time required to perform the manual BPLMN search when the code for determining whether the UE is in the CDRX or the idle mode DRX with the 3GPP LTE PLMN determines that the UE is in the CDRX with the 3GPP LTE PLMN;

code for, when code for determining whether the CDRX duration is greater than or equal to the minimum amount of time determines that the CDRX duration is greater than or equal to the minimum amount of time required for the BPLMN search, performing, by the UE, the manual BPLMN search while in the CDRX with the 3GPP LTE PLMN; and code for, when the code for determining whether the CDRX duration is greater than or equal to the minimum amount of time determines that the CDRX duration is less than the minimum amount of time required for the BPLMN search, suspending the BPLMN search until a next idle mode DRX cycle.

14. The computer-readable medium of claim 13, further comprising code for determining whether the UE is configured for the manual BPLMN search or an automatic BPLMN search when the code for determining whether the UE is in the CDRX or the idle mode DRX with the 3GPP LTE PLMN determines that the UE is in the CDRX.

15. The computer-readable medium of claim 14, further comprising wherein, when configured for the automatic BPLMN search, further includes code for suspending causing at least one computer to suspend the BPLMN search until the next idle mode DRX cycle when the code for determining whether the UE is in the CDRX or the idle mode DRX with the 3GPP LTE PLMN determines that the UE is in the CDRX and the code for determining whether the UE is configured for the manual BPLMN search or the automatic BPLMN search determines that the UE is configured for the automatic BPLMN search.

16. The computer-readable medium of claim 13, wherein the code for determining whether the CDRX duration is greater than or equal to the minimum amount of time determines whether the CDRX is greater than or equal to 640 ms.

* * * * *